United States Patent
Higley et al.

(10) Patent No.: US 11,113,948 B2
(45) Date of Patent: Sep. 7, 2021

(54) METHOD FOR REMINDING A FIRST USER TO COMPLETE A TASK BASED ON POSITION RELATIVE TO A SECOND USER

(71) Applicant: Carrier Corporation, Palm Beach Gardens, FL (US)

(72) Inventors: Jason Higley, Pittsford, NY (US); Wilmann Gomez, New Britain, CT (US); Dang Nguyen, Alpharetta, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/637,896

(22) PCT Filed: Aug. 20, 2018

(86) PCT No.: PCT/US2018/047042
§ 371 (c)(1),
(2) Date: Feb. 10, 2020

(87) PCT Pub. No.: WO2019/036704
PCT Pub. Date: Feb. 21, 2019

(65) Prior Publication Data
US 2020/0175837 A1    Jun. 4, 2020

Related U.S. Application Data

(60) Provisional application No. 62/547,629, filed on Aug. 18, 2017.

(51) Int. Cl.
G08B 21/24    (2006.01)
G06Q 10/10    (2012.01)
H04W 4/02    (2018.01)

(52) U.S. Cl.
CPC .......... G08B 21/24 (2013.01); G06Q 10/109 (2013.01); H04W 4/023 (2013.01)

(58) Field of Classification Search
CPC ...... G08B 21/24; G06Q 10/109; H04W 4/023
(Continued)

(56) References Cited

U.S. PATENT DOCUMENTS 8,508,363 B2 * 8/2013 Raniere ................. G08B 13/14
340/539.32
10,405,129 B2 * 9/2019 Topalli .................... H04W 4/02
(Continued)

FOREIGN PATENT DOCUMENTS

EP    2000961 A1    12/2008

OTHER PUBLICATIONS

Notification of Transmittal of the International Search Report for International Application No. PCT/US2018/047042; Report dated Nov. 26, 2018; Report Received Date: Dec. 3, 2018; 9 pages.
(Continued)

Primary Examiner — Omar Casillashernandez
(74) Attorney, Agent, or Firm — Cantor Colburn LLP

(57) ABSTRACT

A method of monitoring a user is provided. The method comprising: receiving a reminder request from a first user device, the reminder request requesting an alarm to activate on the first user device when the first user device is within a selected distance of a second user device; detecting a first current position of the first user device; detecting a second current position of the second user device; determining a distance between the first current position and the second current position; determining whether the distance is less than or equal to the selected distance; and activating an alarm on the first user device when the distance is less than or equal to the selected distance.

12 Claims, 2 Drawing Sheets

Figure 1:
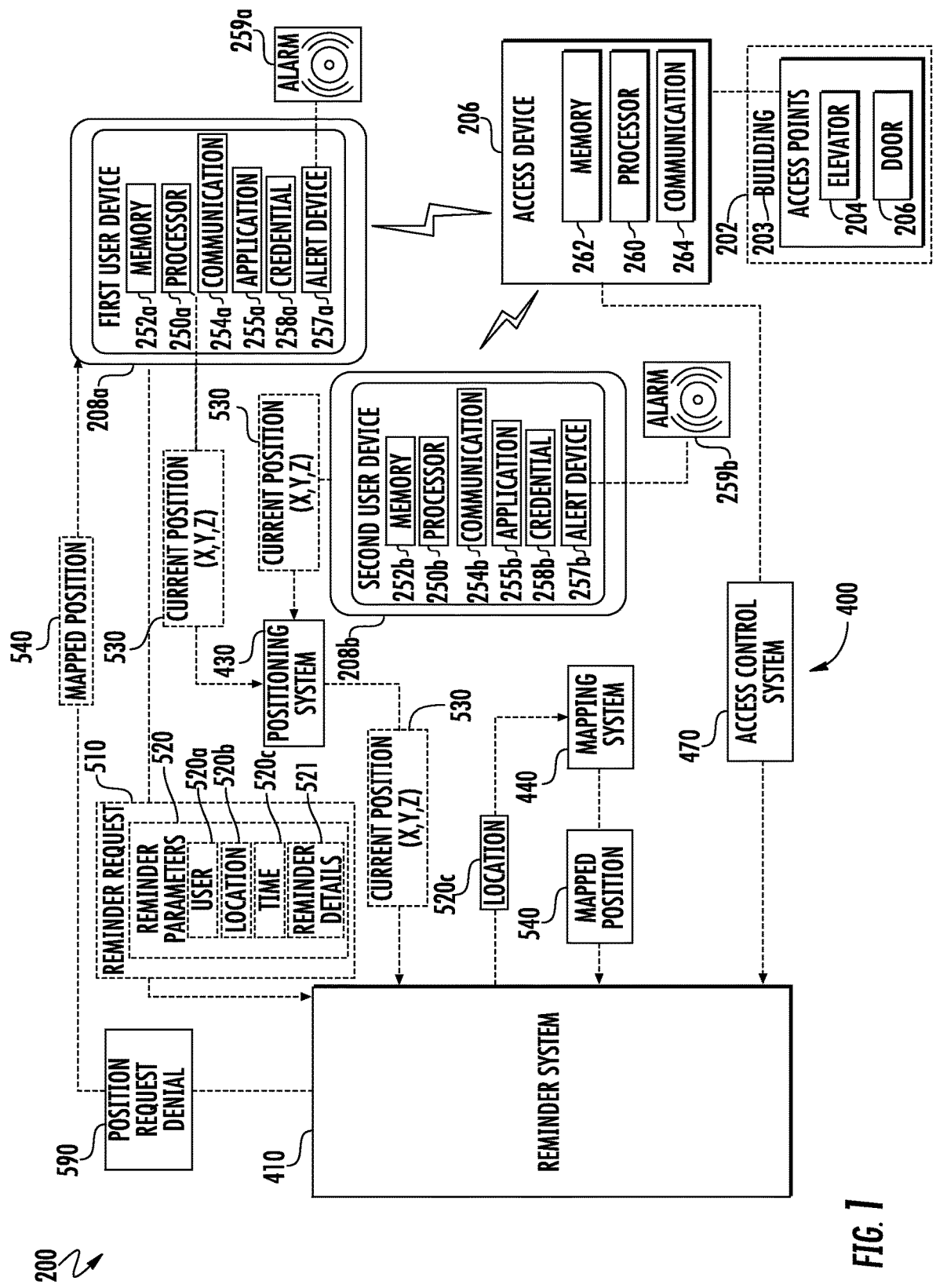

(58) Field of Classification Search
USPC .................................................. 340/539.13
See application file for complete search history.

(56) References Cited

U.S. PATENT DOCUMENTS

| | | | |
|---|---|---|---|
| 2005/0101335 A1* | 5/2005 | Kelly .................... | H04W 4/029 455/456.3 |
| 2010/0004005 A1* | 1/2010 | Pereira .................. | H04W 4/029 455/457 |
| 2013/0012120 A1* | 1/2013 | Liu .................... | H04M 1/72572 455/39 |

OTHER PUBLICATIONS

Written Opinion of the International Searching Authority for International Application No. PCT/US2018/047042; Report dated Nov. 26, 2018; Report Received Date: Dec. 3, 2018; 18 pages.

* cited by examiner

METHOD FOR REMINDING A FIRST USER TO COMPLETE A TASK BASED ON POSITION RELATIVE TO A SECOND USER

CROSS-REFERENCE TO RELATED APPLICATIONS

This application is a National Stage Application of International Application No. PCT/US2018/047042 filed Aug. 20, 2018, which claims the benefit of U.S. Provisional Application No. 62/547,629 filed Aug. 18, 2017, the disclosures of which are incorporated herein by reference in their entirety.

BACKGROUND

The subject matter disclosed herein generally relates to the field of reminder systems, and more particularly to an apparatus and method to alert a user to a reminder.

Existing reminder systems may activate an alarm to notify a user of a reminder at a particular chronological time however more fidelity is desired in reminder systems.

BRIEF SUMMARY

According to one embodiment, a method of monitoring a user is provided. The method comprising: receiving a reminder request from a first user device, the reminder request requesting an alarm to activate on the first user device when the first user device is within a selected distance of a second user device; detecting a first current position of the first user device; detecting a second current position of the second user device; determining a distance between the first current position and the second current position; determining whether the distance is less than or equal to the selected distance; and activating an alarm on the first user device when the distance is less than or equal to the selected distance.

In addition to one or more of the features described above, or as an alternative, further embodiments may include: displaying reminder details of the reminder request on the first user device when the distance is less than or equal to the selected distance.

In addition to one or more of the features described above, or as an alternative, further embodiments may include that the reminder request further includes a time reminder parameter, and wherein the time reminder parameter restricts the alarm to only active when the distance is less than or equal to the selected distance and a current time is about equal to the time reminder parameter.

In addition to one or more of the features described above, or as an alternative, further embodiments may include that the reminder request further includes a location reminder parameter, and wherein the location reminder parameter restricts the alarm to only active when the distance is less than or equal to the selected distance, the first current position is within the location reminder parameter, and the second current position is within the location reminder parameter.

In addition to one or more of the features described above, or as an alternative, further embodiments may include that the location reminder parameter is mapped to a mapped position for comparison with the first current position and the second current position.

In addition to one or more of the features described above, or as an alternative, further embodiments may include: activating an alarm on the first user device when the distance is greater than the selected distance after the distance was determined less than or equal to the selected distance.

According to another embodiment, a reminder system is provided. The reminder system comprising: a processor; and a memory comprising computer-executable instructions that, when executed by the processor, cause the processor to perform operations, the operations comprising: receiving a reminder request from a first user device, the reminder request requesting an alarm to activate on the first user device when the first user device is within a selected distance of a second user device; detecting a first current position of the first user device; detecting a second current position of the second user device; determining a distance between the first current position and the second current position; determining whether the distance is less than or equal to the selected distance; and activating an alarm on the first user device when the distance is less than or equal to the selected distance.

In addition to one or more of the features described above, or as an alternative, further embodiments may include that the operations further comprise: displaying reminder details of the reminder request on the first user device when the distance is less than or equal to the selected distance.

In addition to one or more of the features described above, or as an alternative, further embodiments may include that the reminder request further includes a time reminder parameter, and wherein the time reminder parameter restricts the alarm to only active when the distance is less than or equal to the selected distance and a current time is about equal to the time reminder parameter.

In addition to one or more of the features described above, or as an alternative, further embodiments may include that the reminder request further includes a location reminder parameter, and wherein the location reminder parameter restricts the alarm to only active when the distance is less than or equal to the selected distance, the first current position is within the location reminder parameter, and the second current position is within the location reminder parameter.

In addition to one or more of the features described above, or as an alternative, further embodiments may include that the location reminder parameter is mapped to a mapped position for comparison with the first current position and the second current position.

In addition to one or more of the features described above, or as an alternative, further embodiments may include that the operations further comprise: activating an alarm on the first user device when the distance is greater than the selected distance after the distance was determined less than or equal to the selected distance.

According to another embodiment, a computer program product tangibly embodied on a computer readable medium is provided. The computer program product including instructions that, when executed by a processor, cause the processor to perform operations comprising: receiving a reminder request from a first user device, the reminder request requesting an alarm to activate on the first user device when the first user device is within a selected distance of a second user device; detecting a first current position of the first user device; detecting a second current position of the second user device; determining a distance between the first current position and the second current position; determining whether the distance is less than or equal to the selected distance; and activating an alarm on the first user device when the distance is less than or equal to the selected distance.

In addition to one or more of the features described above, or as an alternative, further embodiments may include that the operations further comprise: displaying reminder details of the reminder request on the first user device when the distance is less than or equal to the selected distance.

In addition to one or more of the features described above, or as an alternative, further embodiments may include that the reminder request further includes a time reminder parameter, and wherein the time reminder parameter restricts the alarm to only active when the distance is less than or equal to the selected distance and a current time is about equal to the time reminder parameter.

In addition to one or more of the features described above, or as an alternative, further embodiments may include that the reminder request further includes a location reminder parameter, and wherein the location reminder parameter restricts the alarm to only active when the distance is less than or equal to the selected distance, the first current position is within the location reminder parameter, and the second current position is within the location reminder parameter.

In addition to one or more of the features described above, or as an alternative, further embodiments may include that the location reminder parameter is mapped to a mapped position for comparison with the first current position and the second current position.

In addition to one or more of the features described above, or as an alternative, further embodiments may include that the operations further comprise: activating an alarm on the first user device when the distance is greater than the selected distance after the distance was determined less than or equal to the selected distance.

Technical effects of embodiments of the present disclosure include a system to save a reminder request including reminder parameters and activate an alarm when the reminder parameters are satisfied.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
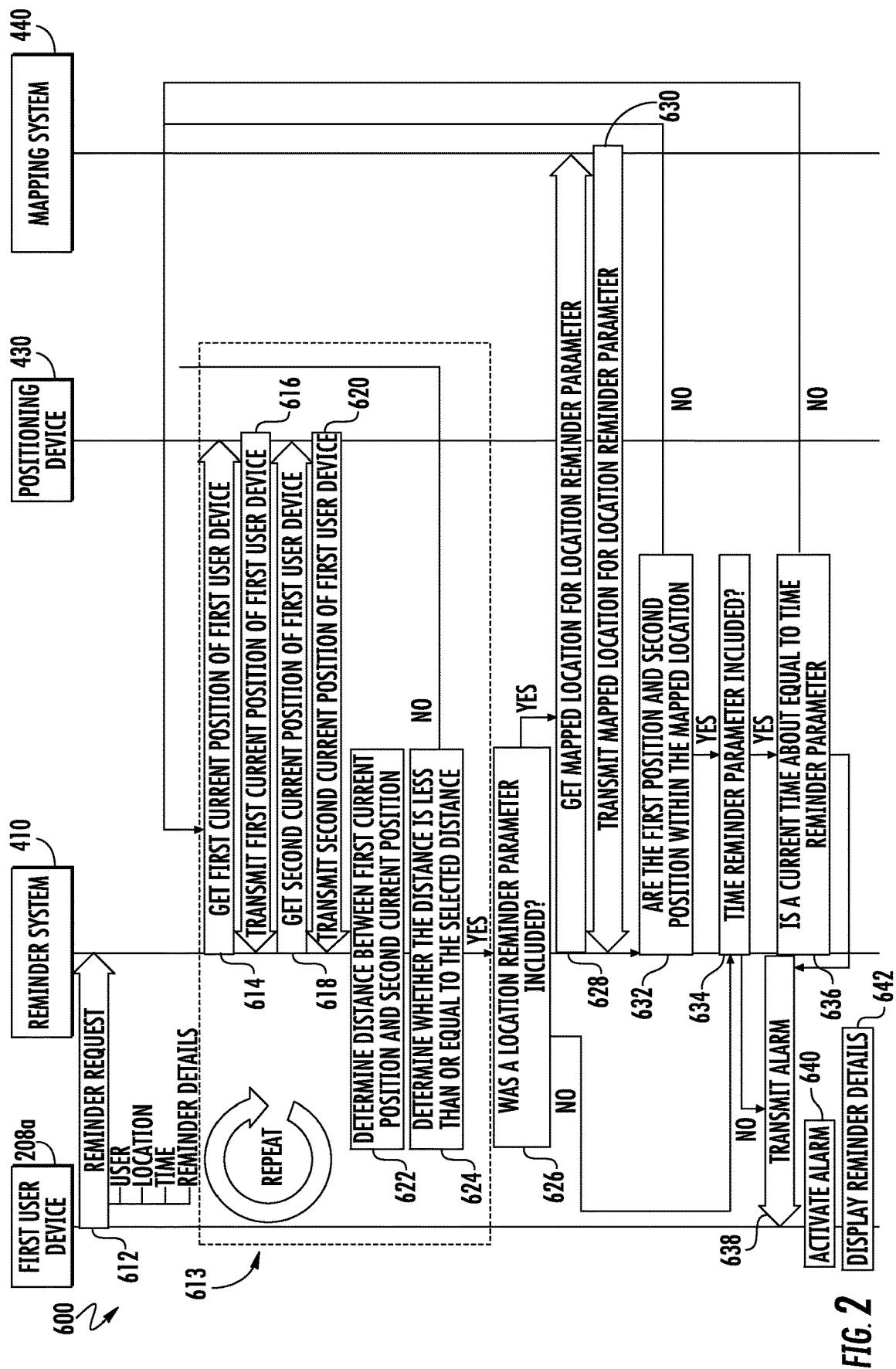

The following descriptions should not be considered limiting in any way. With reference to the accompanying drawings, like elements are numbered alike:

FIG. 1 illustrates a schematic view of a system, in accordance with an embodiment of the disclosure; and FIG. 2 is a flow diagram illustrating a method of reminding a user, according to an embodiment of the present disclosure.

DETAILED DESCRIPTION

A detailed description of one or more embodiments of the disclosed apparatus and method are presented herein by way of exemplification and not limitation with reference to the Figures.

FIG. 1 depicts a system 200 in an example embodiment. The system 200 includes a first user device 208a and a second user device 208b. The first user device 208a and the second user device 208b are capable of secure bi-directional communication with an access device 206, a plurality of interconnected systems 400, and each other.

The first user device 208a may be a computing device such as a desktop computer. The first user device 208a may also be a mobile computing device that is typically carried by a person, such as, for example a phone, PDA, smart watch, tablet, laptop, etc. The first user device 208a may also be two separate devices that are synced together such as, for example, a cellular phone and a desktop computer synced over an internet connection. The first user device 208a may include a processor 250a, memory 252a and communication module 254a as shown in FIG. 1. The processor 250a can be any type or combination of computer processors, such as a microprocessor, microcontroller, digital signal processor, application specific integrated circuit, programmable logic device, and/or field programmable gate array. The memory 252a is an example of a non-transitory computer readable storage medium tangibly embodied in the first user device 208a including executable instructions stored therein, for instance, as firmware. The communication module 254a may implement one or more communication protocols as described in further detail herein. The first user device 208a is configured to store a unique credential 258a that may be shared with the access device 206 and a plurality of interconnected systems 400, discussed further below. In a non-limiting example, the first user device 208a may belong to an employee and/or resident of a building 202. The first user device 208a may include an alert device 257a configured to activate an alarm 259a. In three non-limiting examples, the alert device 257a may be a vibration motor, audio speaker, and/or display screen. The alarm 259a may be audible, visual, haptic, and/or vibratory. The first user device 208a may also include an application 255a. Embodiments disclosed herein, may operate through the application 255a installed on the first user device 208a.

The second user device 208b may be a computing device such as a desktop computer. The second user device 208b may also be a mobile computing device that is typically carried by a person, such as, for example a phone, PDA, smart watch, tablet, laptop, etc. The second user device 208b may also be two separate devices that are synced together such as, for example, a cellular phone and a desktop computer synced over an internet connection. The second user device 208b may include a processor 250b, memory 252b and communication module 254b as shown in FIG. 1. The processor 250b can be any type or combination of computer processors, such as a microprocessor, microcontroller, digital signal processor, application specific integrated circuit, programmable logic device, and/or field programmable gate array. The memory 252b is an example of a non-transitory computer readable storage medium tangibly embodied in the second user device 208b including executable instructions stored therein, for instance, as firmware. The communication module 254b may implement one or more communication protocols as described in further detail herein. The second user device 208b is configured to store a unique credential 258b that may be shared with the access device 206 and a plurality of interconnected systems 400, discussed further below. In a non-limiting example, the second user device 208b may belong to an employee and/or resident of the building 202. The second user device 208b may include an alert device 257b configured to activate an alarm 259b. In three non-limiting examples, the alert device 257b may be a vibration motor, audio speaker, and/or display screen. The alarm 259b may be audible, visual, haptic, and/or vibratory. The second user device 208b may also include an application 255b. Embodiments disclosed herein, may operate through the application 255b installed on the second user device 208b.

As shown in FIG. 1, the system 200 also includes a plurality of interconnected systems 400 including: a reminder system 410, a positioning system 430, a mapping system 440, and an access control system 470. In the illustration of FIG. 1, the interconnected systems 400 are illustrated as separate systems. In an embodiment, at least one of the reminder system 410, the positioning system 430, the mapping system 440, and the access control system 470 may be combined into a single system. In another embodiment, at least one of the reminder system 410, the positioning system 430, the mapping system 420, and the access control system 470 is within the first user device 208a. In another embodiment, at least one of the reminder system 410, the positioning system 430, the mapping system 440, and the access control system 470 is within the second user device 208b.

The interconnected systems 400 may each include a processor, memory, and communication module. For ease of illustration, the processor, memory, and communication module are not shown in FIG. 1. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in or operably connected to the path determination system including executable instructions stored therein, for instance, as firmware. The communication module may implement one or more communication protocols as described in further detail herein.

The positioning system 430 is configured to determine the current position 530 of the first user device 208a and the second user devices 208b. The current position 530 of the first user device 208a may be referred to as the first current position 530 and the current position 530 of the second user device 208b may be referred to as the second current position 530. Each current position 530 includes the (x, y, z) coordinates of the first user device 208a and/or the second user devices 208b on a map. The (x, y, z) coordinates may translate to a latitude, a longitude, and an elevation. The positioning system 430 may use various methods in order to determine the current position 530 such as, for example, GPS, Bluetooth triangulation, WiFi triangulation, cellular signal triangulation, or any other location determination method known to one of skill in the art. The positioning system 430 is configured to transmit the current position 530 to the reminder system 410. The reminder system 410 is configured to receive the current position 530 from the positioning system 430 and may store each current position 530 received.

The reminder system 410 is configured to receive a reminder request 510 from a first user device 208a. The reminder request 510 is a request to activate a reminder when a first user of a first user device 208a is within a select distance of a second user of a second user device 208b. The reminder request 510 will not activate alarm 259a until the first user device 208a and the second user device 208b are within a selected distance of each other. For instance, the first user may wish to tell the second user a joke next time they see each other, so the first user may enter a reminder request 510 for the first user device 208a to activate an alarm 259a containing the reminder request 510 next time the first user sees the second user. The selected distance may be a standard distance saved in the reminder system 410 and/or a variable distance established by a user of the first user device 208a through the application 255a. As mentioned above, the current positions 530 of the first user device 208a and the second user device 208b may be tracked through the positioning system 430. The reminder request 510 may be entered into the application 255a either via a text input and/or a verbal input. The reminder request 510 includes reminder details 521 that will depict the substance of the reminder request 510. For example, the first user may enter into the application 255a of the first user device 208a "When I see the second user remind me to tell the second user this joke," thus the reminder details 521 will be the "joke".

The reminder request 510 may further include reminder parameters 520 including a user 520a, a location 520b, and a time 520c. The reminder parameters 520 specifically tailor who, where, and when the reminder request 510 should generate alarm 259a. The user 520a reminder parameter 520 will indicate what user the reminder request 510 is associated with. For example, the first user may enter into the application 255a of the first user device 208a "When I see the second user remind me to tell the second user this joke," thus the user 520a reminder parameter 520 is the second user. The location 520b reminder parameter 520 may indicate where the user will want the reminder request 510 to alarm 259a. For example, the first user may enter into the application 255a of the first user device 208a "When I see the second user in the cafeteria remind me to tell the second user this joke," thus the location 520b reminder parameter 520 is the cafeteria. In this example, there were two reminder parameters 520 to be fulfilled, the first is that the first user and second user had to be within a select distance of each other and the second is that both the first user and second user had to be in the cafeteria. Additionally, the location 520b of the positional request 510 may to be sent to a mapping device 440 in order to translate the location 520 name into a mapped position 540. The mapped position 540 may be the (x, y, z) coordinates of the location 520b so that the reminder system 410 may compare the current positions 530 with the mapped position 540. For example, the first user may say "cafeteria" but that location 520b reminder parameter 520 will need to be mapped to a mapped position 540 for comparison to the current positions 530.

The time 520c reminder parameter 520 will indicate what time restrictions the reminder request 510 is associated with. For example, the first user may enter into the application 255a of the first user device 208a "When I see the second user in a year remind me to tell the second user this joke," thus the time 520c reminder parameter 520 is the next year. In this example, there were two reminder parameters 520 to be fulfilled, the first is that the first user and second user had to be within a selected distance of each other and the second is that the time had to be "next year".

The system 200 includes at least one access device 206 to grant/deny access to access points 203, such as for example an elevator 204 or a door 205. The access device 206 grants/denies access to access points 203 by adjusting the access point 203, such as, for example, unlocking a door lock or opening an elevator door. The access points 203 may be installed at a building 202. In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more conveyance devices, such as the elevator 204. Persons entering the building 202 may be required to enter a door 205. In another non-limiting embodiment, the door 205 may be outside of a building, such as, for example a car door. The door 205 may include but is not limited to a door in a wall of the building 202, a door on the outside of the building 202, a garage door, a parking lot access gate, a turnstile, a car door, or similar access point known to one of skill in the art.

The access points 203 may be operably connected to one or more access devices 206. The access device 206 may be configured to control access to the access points 203, such as, for example an elevator 204 and a door 205. Although only one elevator 204 is shown in FIG. 1, it is understood that any number of elevators 204 may be used in the system 200. It is understood that other components of the elevator 204 (e.g., elevator car, doors, drive, counterweight, safeties, etc.) are not depicted for ease of illustration. It is also understood that each elevator 204 may utilize one or more access devices 206. In an example, there may be an access device 206 located on each floor of the building 202 located proximate an elevator shaft. Further, although only one door 205 is shown in FIG. 1, it is understood that any number of doors 205 may be used in the system 200. It is understood that other components of doors 205 are not depicted for ease of illustration (e.g., locks). It is also understood that each door 205 may utilize one or more access devices 206.

In a non-limiting example, the access device 206 may be a door reader or door strike. The access device 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the access device 206 including executable instructions stored therein, for instance, as firmware. The memory 262 may store a unique device ID for each access device 206. The memory 262 may also store a set of geo-location information for each access device 206. The first user device 208*a* and the second user device 208*b* may actuate an access device 206 when within a selected range of the access device 206. The communication module 264 allows for secure bi-directional communication wirelessly with the first user device 208*a* and the second user device 208*b*. The communication module 264 may implement one or more communication protocols as described in further detail herein. Communication with the first user device 208*a* and the second user device 208*b* may aid in the positioning system 430 determining a current position 530 of the second user device 208*b*. For example, the second user device 208*b* may have just been used to unlock an access device 206 on a door 205 to a secure location, thus the positioning system 430 may determine that the user of the second user device 208*b* may be in the secure location.

The first user device 208 and the second user device 208*b* communicate with the access device 206, the interconnected systems 400, and with each other. The communication may occur over a wireless network, such as 802.11x (WiFi), short-range radio (Bluetooth), cellular, satellite, etc. In some embodiments, an interconnected system 400 and the access device 206 may include, or be associated with (e.g., communicatively coupled to) a networked system, such as kiosk, beacon, lantern, bridge, router, network node, building intercom system, etc. The networked system may communicate with the first user device 208*a* and the second user device 208*b* using one or more communication protocols or standards. For example, the networked system may communicate with the first user device 208*a* and the second user device 208*b* using near field communications (NFC). In an embodiment, the first user device 208*a* and the second user device 208*b* may communicated with an access device 206 through a networked system. In other embodiments, the first user device 208*a* and the second user device 208*b* may establish communication with an interconnected system 400 or an access device 206 that is not associated with a networked system in the building 202. This connection may be established with various technologies including GPS, 802.11x (WiFi), cellular, or satellite, by way of non-limiting example. In example embodiments, the first user device 208*a* and the second user device 208*b* communicate over multiple independent wired and/or wireless networks. Embodiments are intended to cover a wide variety of types of communication between the first user device 208*a*, the second user device 208*b*, the access device 206, and the interconnected systems 400, thus embodiments are not limited to the examples provided in this disclosure.

Referring now to FIG. 2, with continued reference to FIG. 1. FIG. 2 shows a flow chart of method 600 of reminding a user, in accordance with an embodiment of the disclosure. At block 612, a reminder request 510 is transmitted by a first user device 208*a* and received by the reminder system 410. The reminder request 510 may be submitted by a first user through an application 255*a* on the first user device 208*a*. As mentioned above, the reminder request 510 may include reminder request parameters 520 including but not limited to a user 520*a*, a location 520*b*, and a time 520*c*. The reminder request 510 also includes reminder details 521 depicting what the reminder request 510 was intended to remind the first user of the first user device 208*a* to tell a second user of a second user device 208*b*.

After the reminder request, the reminder system 410 enters into a repeatable cycle at 613 until a distance between the first user and the second user is less than or equal to a selected distance. At block 614, the reminder system 410 requests the positioning system 430 to obtain the first current position 530 of the first user device 208*a*. At block 616, the positioning system 430 detects the first current position 530 of the first user device 208*a* and transmits the first current position 530 of the first user device 208*a* back to the reminder system 410. At block 618, the reminder system 410 requests the positioning system 430 to obtain the second current position 530 of the second user device 208*b*. At block 620, the positioning system 430 detects the second current position 530 of the second user device 208*b* and transmits the second current position 530 of the second user device 208*b* back to the reminder system 410. At block 622, a distance is determined between the first current position 530 and the second current position 530. At block 624, it is determined whether the distance is less than or equal to a selected distance. As mentioned above, the selected distance may be a standard distance or a distance established by a first user of the first user device 208*a*. At block 624, if it is determined that the distance is not less than or equal to a selected distance, then method 600 will repeat 613.

At block 624, if it is determined that the distance is less than or equal to a selected distance, then method 600 will move on to block 626. At block 626, the reminder system 410 checks whether a location 520*b* reminder parameter 520 was included in the reminder request 510. The location 520*b* reminder parameter 520 restricts the alarm 259*a* to only active when the distance is less than or equal to the selected distance, the first current position is within the location reminder parameter, and the second current position is within the location 520*b* reminder parameter 520. At block 626, if a location 520*b* reminder parameter 520 was included in the reminder request 510 then the method 600 moves on to block 628 but if a location 520*b* reminder parameter 520 was not included in the reminder request 510 then the method 600 moves on to block 634. At block 628, the reminder system 410 transmits a request to the mapping system 440 to get a mapped position 540 for the location 520*b* reminder parameter 520 that was included in the reminder request 510. The mapping system 440 maps a mapped position 540 to the location 520*b* reminder parameter and then transmits the mapped position 540 back to the reminder system 410.

At block 632, the reminder system 410 checks whether the first position 530 of the first user device 208*a* and the second position 530 of the second user device 208*b* are within the mapped position 540. At block 632, if the first position 530 of the first user device 208*a* and the second position 530 of the second user device 208*b* are within the mapped position 540 then the method 600 moves onto block 634. At block 632, if the first position 530 of the first user device 208*a* and the second position 530 of the second user device 208*b* are not within the mapped position 540 then the method 600 moves back to 613.

At block 634, the reminder system 410 checks whether a time 520*c* reminder parameter 520 was included in the reminder request 510. The time 520*c* reminder parameter 520 restricts the alarm 259*a* to only active when the distance is less than or equal to the selected distance and a current time is about equal to the time 520*c* reminder parameter 520. At block 634, if a time 520*c* reminder parameter 520 was included in the reminder request 510 then the method 600 moves on to block 636 but if a time 520*c* reminder parameter 520 was not included in the reminder request 510 then the method 600 onto block 638. At block 636, the reminder system 410 check whether a current time is about equal to the time 520*c* reminder parameter 520. At block 636, if a current time is about equal to the time 520*c* reminder parameter 520 then the method 600 moves onto block 638 but if a current time is not about equal to the time 520*c* reminder parameter 520 then the method 600 moves back to 613.

At block 638, the reminder system 410 transmits an alarm to the first user device 208*a* and at block 640 an alarm 529*a* is activated on the first user device 208*a*. At block 642, the reminder details 521 are displayed on the first user device 208*a* when the distance is less than or equal to the selected distance. The method may further include activating an alarm 259*a* on the first user device 208*a* when the distance is greater than the selected distance after the distance was determined less than or equal to the selected distance. Thus, the alarm 259*a* may also activate when the first device 208*a* and the second device 208*b* begin to separate and increase the distance between each other past the selected distance.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of monitoring a user, the method comprising:
   receiving a reminder request from a first user device belonging to a first user the reminder request requesting an alarm to activate on the first user device when the first user device is within a selected distance of a second user device belonging to a second user;
   detecting a first current position of the first user device;
   detecting a second current position of the second user device;
   determining a distance between the first current position and the second current position;
   determining whether the distance is less than or equal to the selected distance; and
   activating an alarm on the first user device when the distance is less than or equal to the selected distance,
   wherein the reminder request comprises:
      a time reminder parameter, wherein the time reminder parameter restricts the alarm to only active when the distance is less than or equal to the selected distance and a current time is about equal to the time reminder parameter; and
      a location reminder parameter, wherein the location reminder parameter restricts the alarm to only activate when the distance is less than or equal to the selected distance, the first current position is within the location reminder parameter, and the second current position is within the location reminder parameter, wherein the first user establishes the time reminder parameter and the location parameter by entering the reminder request into the first user device.

2. The method of claim 1, further comprising:
displaying reminder details of the reminder request on the first user device when the distance is less than or equal to the selected distance.

3. The method of claim 1, wherein:
the location reminder parameter is mapped to a mapped position for comparison with the first current position and the second current position.

4. The method of claim 1, further comprising:
activating an alarm on the first user device when the distance is greater than the selected distance after the distance was determined less than or equal to the selected distance.

5. A reminder system comprising:
a processor; and
a memory comprising computer-executable instructions that, when executed by the processor, cause the processor to perform operations, the operations comprising:
receiving a reminder request from a first user device belonging to the first user, the reminder request requesting an alarm to activate on the first user device when the first user device is within a selected distance of a second user device belonging to a second user;
detecting a first current position of the first user device;
detecting a second current position of the second user device;
determining a distance between the first current position and the second current position;
determining whether the distance is less than or equal to the selected distance; and
activating an alarm on the first user device when the distance is less than or equal to the selected distance,
wherein the reminder request comprises:
  a time reminder parameter, wherein the time reminder parameter restricts the alarm to only active when the distance is less than or equal to the selected distance and a current time is about equal to the time reminder parameter; and
  a location reminder parameter, wherein the location reminder parameter restricts the alarm to only activate when the distance is less than or equal to the selected distance, the first current position is within the location reminder parameter, and the second current position is within the location reminder parameter,
wherein the first user establishes the time reminder parameter and the location parameter by entering the reminder request into the first user device.

6. The reminder system of claim 5, wherein the operations further comprise:
displaying reminder details of the reminder request on the first user device when the distance is less than or equal to the selected distance.

7. The reminder system of claim 5, wherein:
the location reminder parameter is mapped to a mapped position for comparison with the first current position and the second current position.

8. The reminder system of claim 5, wherein the operations further comprise:
activating an alarm on the first user device when the distance is greater than the selected distance after the distance was determined less than or equal to the selected distance.

9. A computer program product tangibly embodied on a computer readable medium, the computer program product including instructions that, when executed by a processor, cause the processor to perform operations comprising:
receiving a reminder request from a first user device belonging to a first user, the reminder request requesting an alarm to activate on the first user device when the first user device is within a selected distance of a second user device belonging to a second user;
detecting a first current position of the first user device;
detecting a second current position of the second user device;
determining a distance between the first current position and the second current position;
determining whether the distance is less than or equal to the selected distance; and
activating an alarm on the first user device when the distance is less than or equal to the selected distance,
wherein the reminder request comprises:
  a time reminder parameter, wherein the time reminder parameter restricts the alarm to only active when the distance is less than or equal to the selected distance and a current time is about equal to the time reminder parameter; and
  a location reminder parameter, wherein the location reminder parameter restricts the alarm to only activate when the distance is less than or equal to the selected distance, the first current position is within the location reminder parameter, and the second current position is within the location reminder parameter, and
wherein the first user establishes the time reminder parameter and the location parameter by entering the reminder request into the first user device.

10. The computer program product of claim 9, wherein the operations further comprise:
displaying reminder details of the reminder request on the first user device when the distance is less than or equal to the selected distance.

11. The computer program product of claim 9, wherein:
the location reminder parameter is mapped to a mapped position for comparison with the first current position and the second current position.

12. The computer program product of claim 9, wherein the operations further comprise:
activating an alarm on the first user device when the distance is greater than the selected distance after the distance was determined less than or equal to the selected distance.

* * * * *